July 7, 1959 G. H. RIDINGS ET AL 2,894,063

FACSIMILE TICKET AND MESSAGE SYSTEM

Filed June 13, 1955 7 Sheets-Sheet 1

INVENTORS
G. H. RIDINGS
R. J. WISE
C. JELINEK, JR.

BY

[signature]

ATTORNEY

FACSIMILE TICKET AND MESSAGE SYSTEM

Filed June 13, 1955 7 Sheets-Sheet 2

INVENTORS
G. H. RIDINGS
R. J. WISE
C. JELINEK, JR.
BY
[signature]
ATTORNEY

FACSIMILE TICKET AND MESSAGE SYSTEM

Filed June 13, 1955 7 Sheets-Sheet 3

BY

INVENTORS
G. H. RIDINGS
R. J. WISE
C. JELINEK, JR.

ATTORNEY

July 7, 1959 G. H. RIDINGS ET AL 2,894,063

FACSIMILE TICKET AND MESSAGE SYSTEM

Filed June 13, 1955 7 Sheets-Sheet 4

INVENTORS
G. H. RIDINGS
R. J. WISE
C. JELINEK, JR.

BY

ATTORNEY

FACSIMILE TICKET AND MESSAGE SYSTEM

Filed June 13, 1955 7 Sheets-Sheet 5

BY

*INVENTORS*
G. H. RIDINGS
R. J. WISE
C. JELINEK, JR.
[signature]
ATTORNEY

INVENTORS
G. H. RIDINGS
R. J. WISE
C. JELINEK, JR.
BY
[signature]
ATTORNEY

INVENTORS
G. H. RIDINGS
R. J. WISE
C JELINEK, JR.
BY
[signature]
ATTORNEY 2,894,063

FACSIMILE TICKET AND MESSAGE SYSTEM

Garvice H. Ridings, Summit, Raleigh J. Wise, Arlington, and Charles Jelinek, Jr., Verona, N.J., assignors to The Western Union Telegraph Company, New York, N.Y., a corporation of New York Application June 13, 1955, Serial No. 514,959

16 Claims. (Cl. 178—6.6)

This invention relates to a facsimile system, and particularly to such a system adapted to validate and issue tickets, coupons or the like, having certain preprinted matter thereon, at an outlying office, such as a branch ticket office or a patron's office, in response to facsimile signals transmitted from a reservation bureau, or ticket control center, where orignal or master tickets or coupons are prepared and retained for reservation, accounting and other purposes.

While not limited thereto the invention is especially applicable to the reservation and sale of railroad or Pullman space by a number of agents at different ticket offices. Heretofore it has been customary to allocate groups or blocks of tickets for such space to the different ticket offices, with the result that frequently it was not known up to the time of departure of a train whether all of the space had been sold or not, this condition being aggravated by cancellations made on the day of departure. Consequently many trains would leave with unsold space which could have been sold if a central control office, or ticket center, had this information at a reasonable time prior to the departure time. Surveys made by one of the large railroads revealed that the revenue losses due to unsold space which could have been sold on its first-class trains if the exact reservation status had been known prior to the departure times, exceeded a million dollars per year. Similar conditions apply to the sale of tickets for theatres, sporting events and the like.

In accordance with the instant invention, a facsimile transmitter and a facsimile recorder are provided at each satellite station or branch ticket office, for example, a railroad ticket office. At the ticket control center a number of facsimile transmitters and recorders are provided for interconnection with the circuits from the various branch offices. An available transmitter and recorder may be connected, as by a plug and jack or a push button, directly to any branch office circuit. Alternatively, a facsimile concentrator may be employed, which is a switching arrangement adapted for the interconnection of a number of branch office circuits to a lesser number of circuits which terminate in the transmitters and recorders at the ticket center in order to obtain more efficient use of the equipment. Suitable concentrator arrangements are well known in the art, for example, as disclosed in the U.S. patent to Ridings et al. No. 2,606,963, issued August 12, 1952. Preferably the recorder at each branch office is in accordance with the apparatus disclosed in the U.S. application of Wise and Zabriskie, Serial No. 470,628, filed November 23, 1954, now Patent No. 2,872,275, issued February 3, 1959. Should a traveler desire Pullman or other reserved space on a certain train for a particular date, the agent or clerk at the branch office will send a request, as by means of a written Pullman space request form or a telegram transmitted by his facsimile transmitter, to an idle recorder at the control center. The transmitters at the various branch offices and at the control center preferably embody various features disclosed in the aforesaid Wise and Zabriskie case, particularly in regard to wrapping a request form or a telegram at a branch office, or a coupon or a message form at the control center, around a transmitting drum, and for line feed scanning and unwrapping operations. The agent, knowing the price of the requested space, will be prepared to place the correctly priced ticket form on the loading platform of his recorder to receive a facsimile of the proper space coupon from the ticket center. The ticket form preferably comprises a dry electrosensitive recording blank, for example, one of the types disclosed in U.S. Patents Nos. 2,251,742, 2,294,146, 2,528,005 and 2,681,309. Such a ticket form, which is approximately 4" x 5½" in size, has certain preprinted data on a portion of the face thereof, including the net price of the ticket, the amount of the tax, and the total price paid. This data is printed in different colored inks to enable ready selection of a ticket form in the proper price range. The ticket form is perforated along lines so that it is separable into three slips, the first of which is a stub to be retained by the selling agent, the second being a slip that is taken up and retained by the conductor on the train, and the third being a check that is detached by the conductor and returned to the passenger.

The reservation request transmitted by the agent at the branch office will be received on an idle recorder at the control center in approximately eight seconds. End-of-message lights then appear at both machines, and the branch office clerk and a control center clerk attend the machines. If the desired reservation is available, the control center clerk inserts a master ticket or coupon with the proper notations thereon in a transmitter, and presses a "coupon" start button. The coupon is wrapped around a transparent cylinder or open-ended drum in the transmitter for internal scanning by a rotating mirror within the drum; a photocell in the optical system generates facsimile intelligence signals in accordance with the indicia appearing on the coupon. The fact that the transmitter at the control center is ready to send signals representing the requested space is indicated on the recorder at the branch ticket office by the sounding of a buzzer and the lighting of a "coupon" lamp there. The agent thereupon places the proper ticket form on the loading platform of his recorder, and presses a start button which causes the ticket form to be drawn into his recorder and wrapped around a cylindrical drum to form a cylindrical tube with substantially half the length thereof extending from an end of the forming drum whereby the inner surface of the extending portion of the wrapped ticket form may be scanned and marked, by a rotating electrical stylus within that portion of the tube, in accordance with the incoming facsimile intelligence signals from the coupon at the ticket center. The recorder is caused to phase with the ticket center transmitter, transmission of the signals is started, and the ticket is validated by the indicia recorded thereon by the recording stylus. When the reception is completed, the "coupon" lamp ceases to glow, the buzzer again sounds, an "end-of-message" lamp glows and the validated ticket is unwrapped and ejected onto the loading platform. In response to the "end-of-message" signals, the agent removes the recorded ticket form from the recorder and presses an "end-of-message" button which silences the buzzer and extinguishes the "end-of-message" lamp.

In the above transaction if the space requested had not been available, the return call from the ticket center would have been indicated by the buzzer and the glowing of a "message" lamp at the recorder. In that event the agent would have placed a plain electrosensitive recording blank on his machine and the reception of the facsimile message sent by the control center to such effect would have been received in the same manner as above described for the validation of the ticket form.

Such a message may also give information as to other space available on the specified train or the availability of space on a different train.

One of the objects of the instant invention is to provide a facsimile reservation system having transmitting, control and signal circuits adapted for the validation and issuance of tickets at outlying receiving offices by means of facsimile intelligence signals generated by scanning master tickets or coupons at a reservation or control center.

Another object is the provision of a system of the foregoing character in which a ticket form having a blank area and an area with preprinted indicia thereon may be validated by incoming facsimile intelligence signals applied to the blank area thereof.

A further object is to provide a system of the character described, in which a recorder is adapted to validate ticket forms and also to receive messages on a recording blank in response to incoming facsimile signals from a transmitter, and in which signal means at the recorder are operable over the facsimile circuit from the transmitter to indicate whether a ticket form or a message form is to be placed in the recorder for receiving the intelligence signals to follow.

An additional object is the provision of revertive control circuits operable over the facsimile circuit for preventing a transmitter from sending facsimile intelligence signals to a recorder when the latter does not have a ticket form or a recording blank positioned therein for the reception of the facsimile signals.

Another object is to provide a facsimile system with improved means for phasing a transmitter and recorder prior to transmission of intelligence signals, and particularly to a phasing system which integrates a plurality of coincidence pulses to prevent misphasing by reason of line hits or other interference during a phasing operation.

Still another object is the provision of novel means for preventing the transmission of facsimile signals when scanning certain predetermined areas of a coupon or other message sheet.

Other objects and advantages of the invention will be apparent from the following detailed description of an illustrative embodiment thereof, taken in connection with the accompanying drawings in which.

Figure 5:
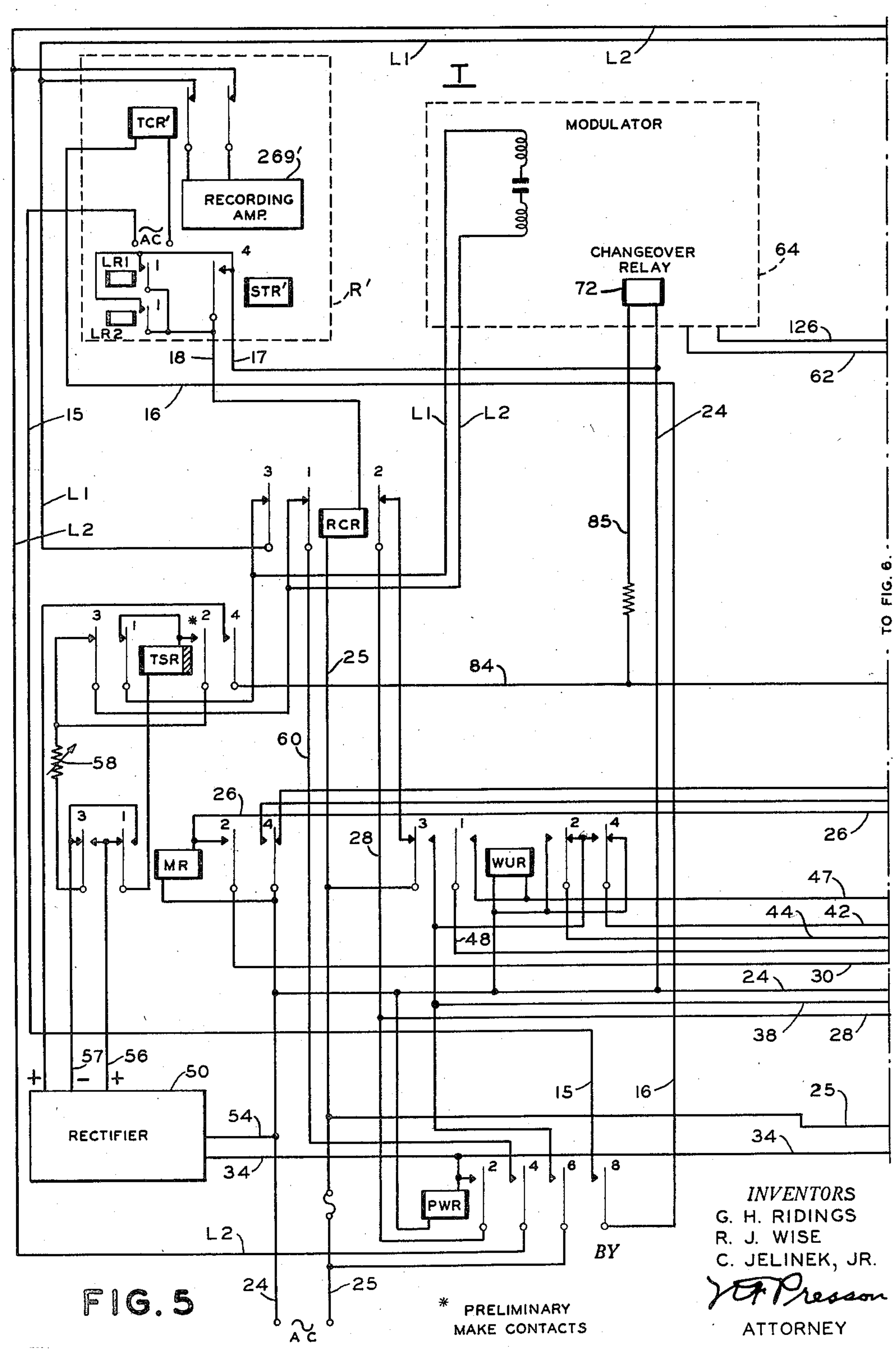
Figure 6:
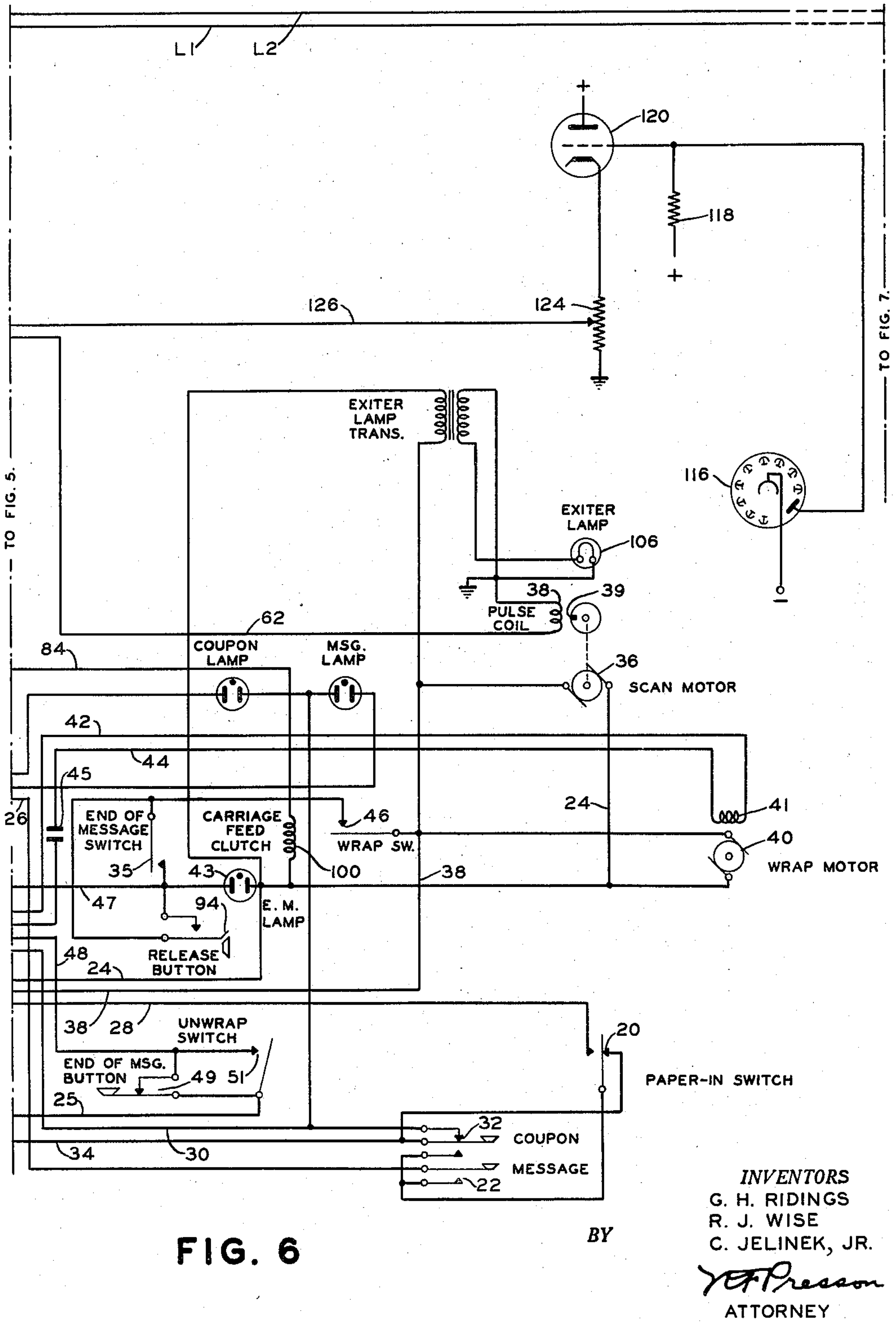
Figure 7:
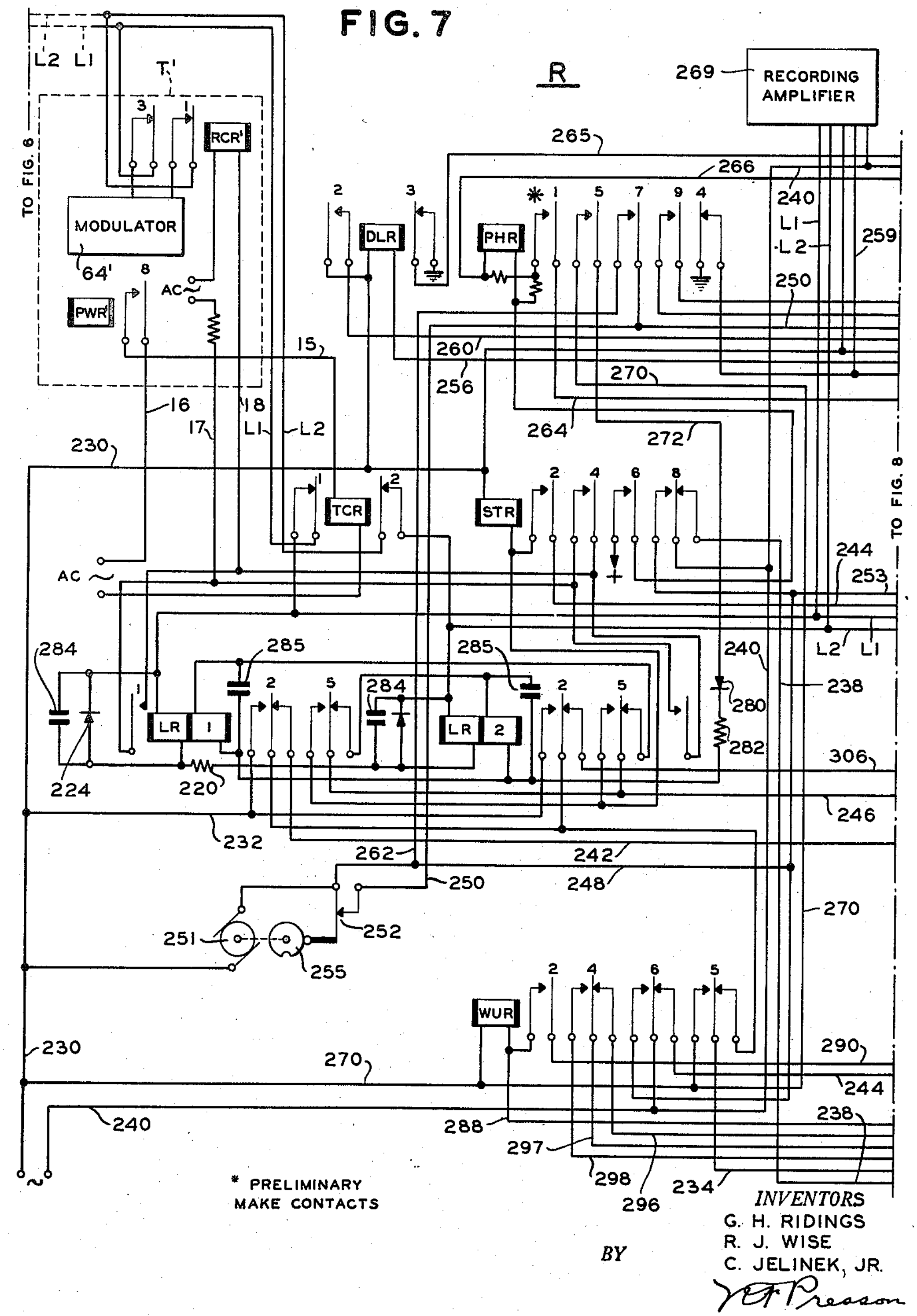
Figure 8:
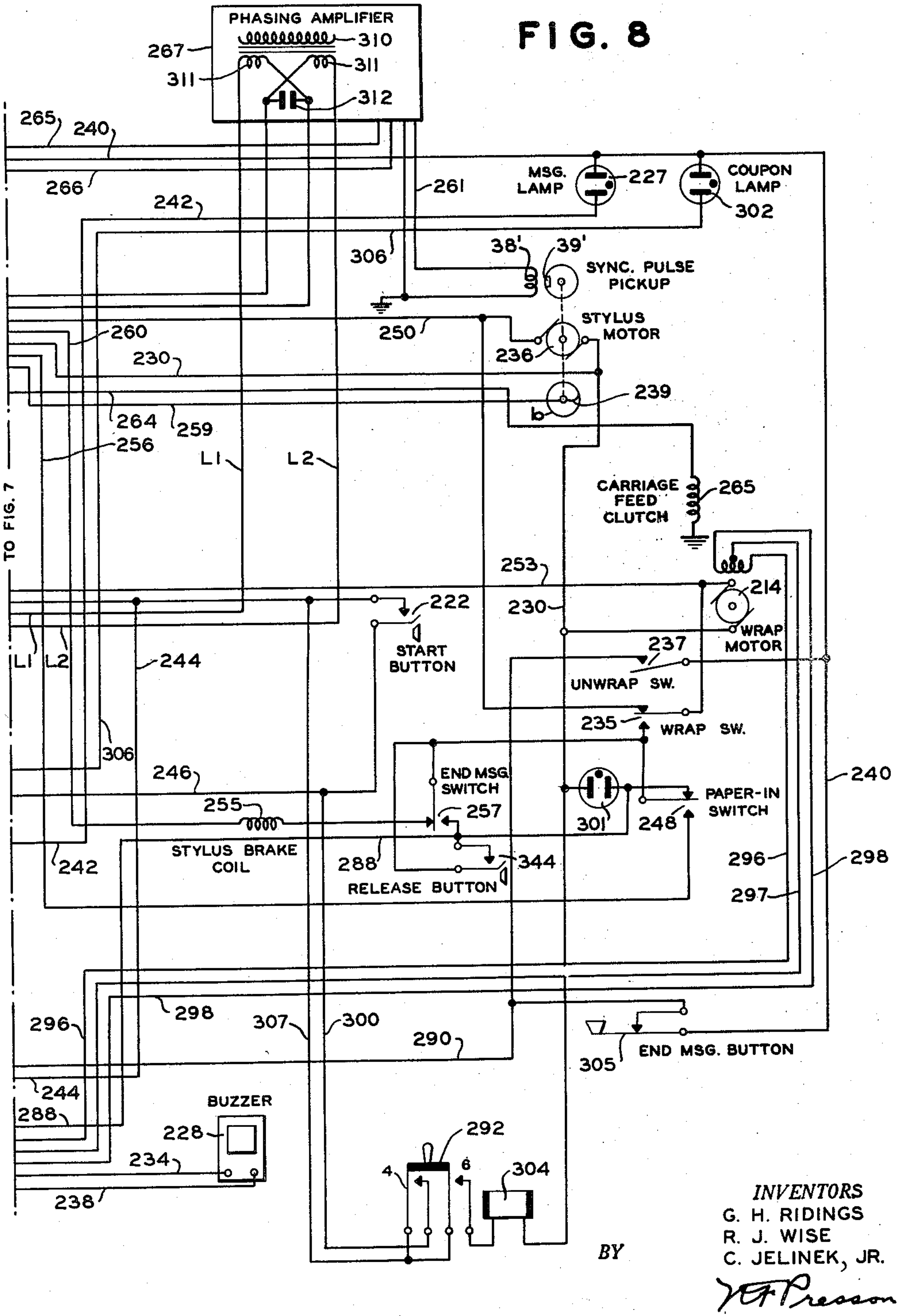
Figure 9:
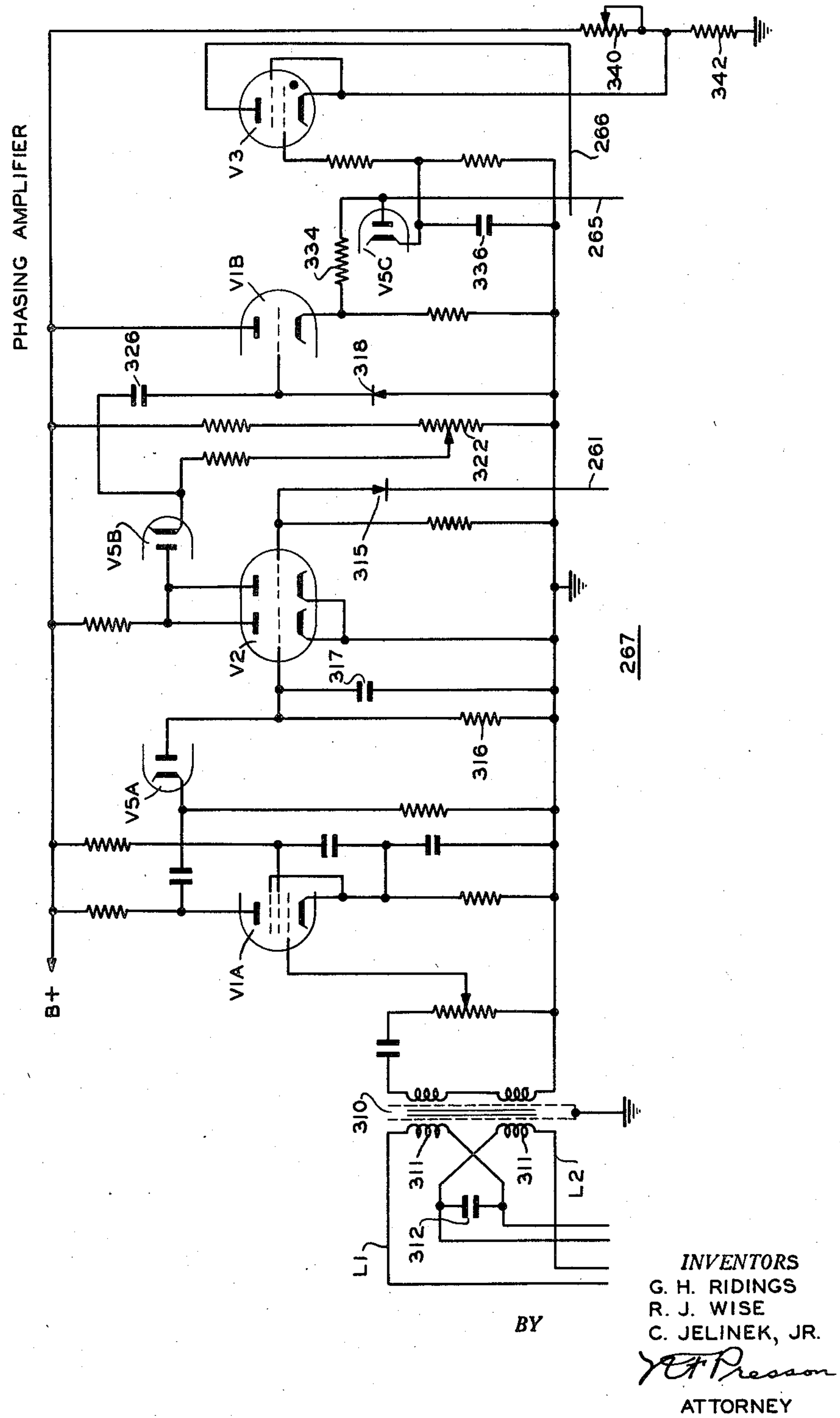
Figure 10:
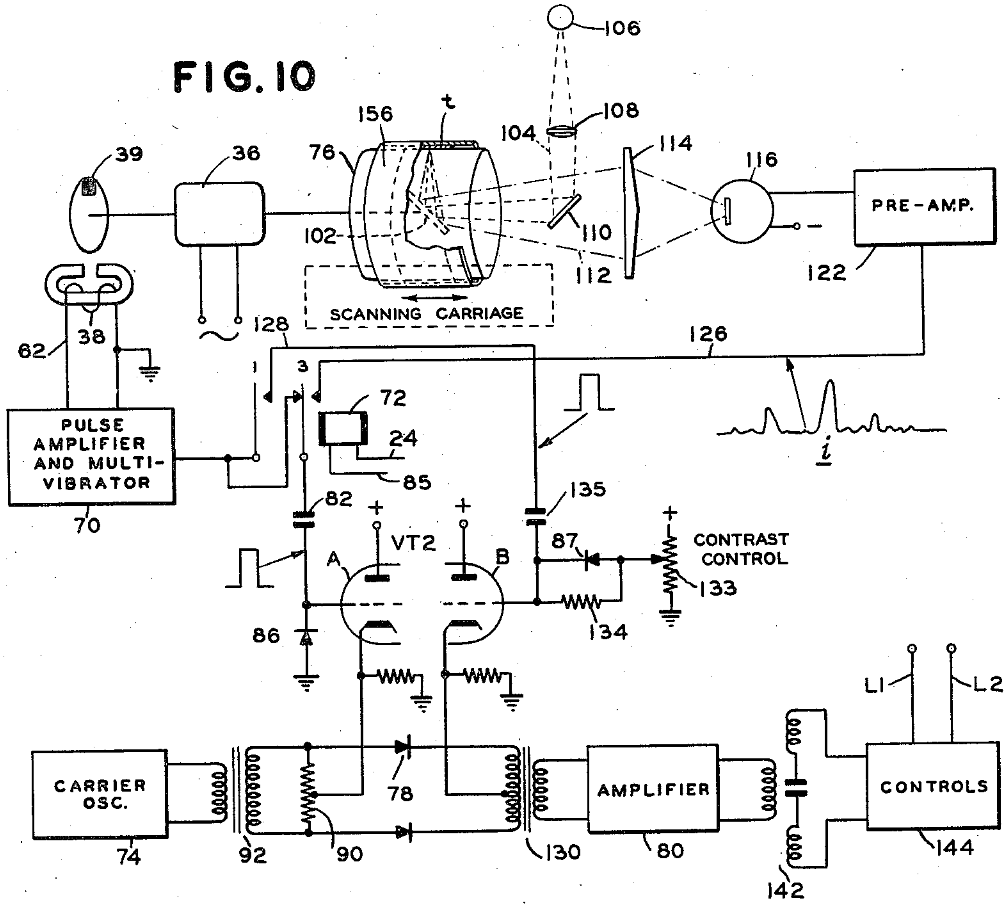
Figures 11, 12, 13:
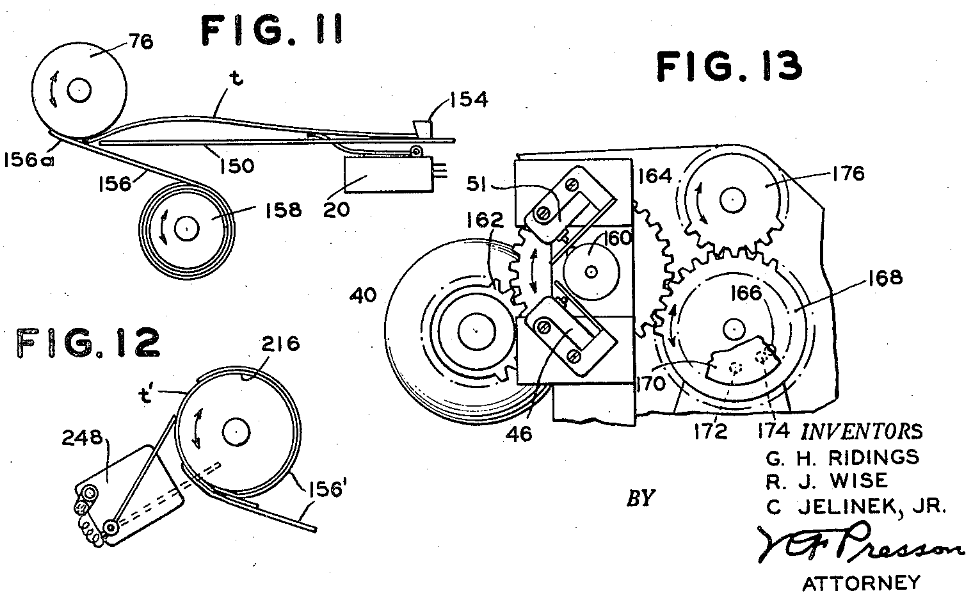

Figs. 5 and 6 together show a detailed wiring diagram of the transmitting terminal at the control center;

Figs. 7 and 8 together show a detailed wiring diagram of the branch office receiving terminal;

Fig. 9 is a wiring diagram of a phasing amplifier employed at the receiving terminal;

Fig. 10 is a schematic of a scanning, phasing and blanking system employed at the transmitting terminal;

Fig. 11 is a view of certain elements of the wrapper mechanism, including a "paper-in" switch which is actuated when a coupon or other message form is in the transmitter;

Fig. 12 is a view of a "paper-in" switch which is actuated when a ticket form or other recording blank is in the recorder; and Fig. 13 is a fragmentary view of "wrap" and "unwrap" switches employed in the control circuits, and including stop members for limiting the extent of movement of a cylindrical drum or former when wrapping and unwrapping a ticket, ticket form or other message blank in the transmitter or recorder.

*General description of system*

Figure 1:
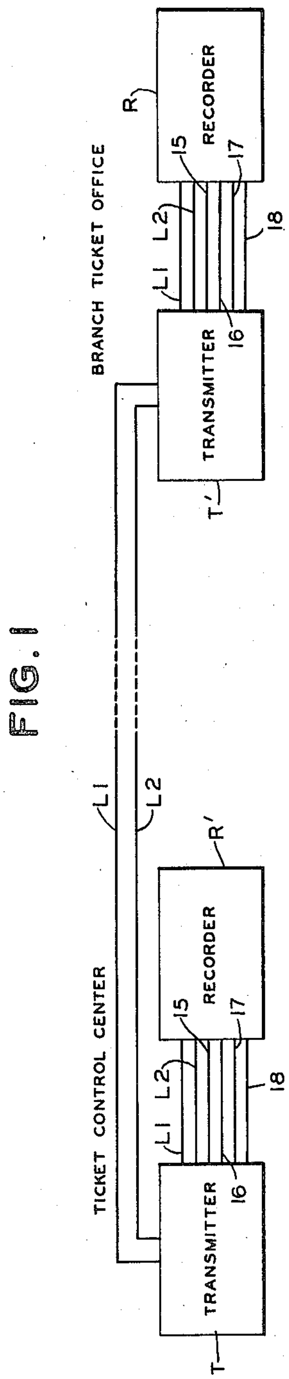
Fig. 1 is a diagrammatic view showing a ticket control center and a branch ticket office interconnected by a transmission line.

Referring to Fig. 1 of the drawings, there is diagrammatically shown a ticket reservation system in which line wires L1 and L2 interconnect a reservation bureau, or ticket control center, with an outlying branch ticket office. In response to a request from the branch ticket office for a certain type of reservation, the clerk at the control center will, if the desired accommodation is available, insert the proper master ticket or coupon, shown at *t* in Fig. 2, in his facsimile transmitter T, and depress a "coupon" button which causes a "coupon" light to glow at the branch ticket office recorder R. The master ticket, or coupon, has on the lower end thereof a preprinted colored area, indicated by the word COLOR in the figure; different colors are employed for different classes of accommodations to facilitate selection of the proper coupon. The agent at the branch office then inserts the proper ticket form in his recorder R; such a ticket form is shown at *t'* in Fig. 3 and comprises an electrosensitive recording blank having certain preprinted data in the proper color of ink on the left-hand portion thereof, the right-hand portion being blank. When the ticket form *t'* is in the recorder R in proper position for recording, a control signal is automatically sent to the transmitter T which thereupon optically scans and transmits the data on the master ticket *t*; this data is recorded by an electrical stylus on the right-hand portion of the ticket form *t'* to validate the latter, shown in Fig. 4, and the validated ticket form is ejected from the recorder. The ticket form is perforated along the lines *p* so that it is separable into three slips as hereinbefore stated. If the requested reservation is not available the ticket center clerk would insert a message form to such effect, instead of a master ticket, in his transmitter, and depress a "message" button which causes a "message" light to glow at the branch office recorder R, whereupon the agent there would have inserted a plain electrosensitive blank, instead of a ticket form *t'*, in his recorder to receive the message.

The branch ticket clerk may communicate with the ticket center in any desired manner, but preferably this is done by a local facsimile transmitter T' which optically scans a written request form or other message and transmits signals to cause the message to be recorded on an electro-sensitive recording blank in a local recorder R' at the ticket center, thereby effecting two-way facsimile communication over the line wires L1 and L2. The transmitter T and recorder R' at the ticket center are interconnected by line circuits L1, L2, and conductors 15 to 18, so that when the transmitter is in use the recorder is automatically disconnected, and vice versa, and similar control circuits are provided between the recorder R and transmitter T' at the branch office. It will be understood that there are a number of branch ticket offices in such a reservation system, and that there are a sufficient number of transmitters and recorders at the ticket center to accommodate the branch offices either through direct lines or concentrator or other switching equipment, although for the sake of simplicity only one branch office line is illustrated. The recorder R' at the ticket center preferably is like the recorder R at the branch office, although it may be any other suitable type, and similarly the transmitter T' preferably is like the transmitter T at the ticket center, but may be any other suitable type.

To effect a transmitting operation a ticket *t* or other message form is placed in the transmitter T and is wrapped around a transparent forming cylinder diagrammatically shown and identified by reference numeral 76 in Figs. 10 and 11, with the subject-matter on the ticket or sheet facing inwardly. In the case of a ticket the colored end thereof is the trailing end as the ticket is wrapped. Means for manually rotating a transparent cylinder to cause a sheet and an overlying flexible wrapper web to be wrapped together around the outer periphery of a cylinder are disclosed in the U.S. patent to Young No. 2,639,322, issued May 19, 1953. In the instant case a wrap motor rotates the cylinder automatically through an angle of approximately 380 degrees, whereby the overlying wrapper web 156 causes the trailing end of the ticket or message sheet to slightly overlap and extend past the leading end thereof. By means of a rotating mirror 102 within the cylinder, a beam of light 104 is caused to describe a circle upon the inside face of the wrapped ticket or sheet through the wall of the cylinder, and the cylinder is supported on a movable line-feed scanning carriage and is advanced axially thereby, as indicated by arrows in Fig. 10, at the proper rate to effect a helical scanning operation for generating facsimile intelligence signals.

To effect a recording operation a ticket form *t'* or other electrosensitive recording blank is wrapped around the outer periphery of a forming cylinder 216, Fig. 12, automatically by means of a wrap motor and a flexible wrapper web generally in the manner of the transmitter, with the trailing end of the blank extending past the leading end thereof by a substantial amount. The length of the forming cylinder is but approximately half the width of the ticket form or recording blank, so that the fairly rigid wrapped blank, now in cylindrical form, has that portion thereof on which a recording is to be effected extending axially beyond the end of the formnig cylinder. A rotating electrical stylus is positioned within the extending portion of the wrapped blank for recording engagement with the inner surface thereof, and the stylus is supported on a movable line-feed scanning carriage and is advanced axially thereby at the proper rate to effect helical scanning of the inner surface of the blank for recording the facsimile intelligence signals incoming from a transmitter.

Referring again to Fig. 11, which shows elements of the wrapper mechanism and a "paper-in" switch 20 in a transmitter, a loading platform or bed 150 has a front rail 154 against which the trailing end of a ticket form *t* or other message form abuts to cause the same to bow up slightly thereby to assure that its leading, or left-hand, end will be gripped between the transparent forming cylinder 76 and wrapper web 156. When the ticket or message form is thus inserted it actuates the "paper-in" switch. This switch, hereinafter referred to in the detailed description of the circuit drawings, is a microswitch which may be operated from one position to another by a small force applied to the actuating lever of the switch, which lever extends up through a slot in the platform, so that it responds to the pressure exerted thereon by the bowed ticket *t* which usually is composed of thin cardboard, the right end of the ticket being forced downwardly along the tapered wall of the front rail, as shown. The flexible wrapper web 156 has its leading end 156a fastened, as by cement, to the cylindrical former 176 which is rotated in a clockwise direction as viewed in Fig. 11 by a wrap motor, indicated at 40 in Fig. 13, for wrapping the ticket *t* around the cylinder preparatory to a scanning operation. The remaining portion of the wrapper web is wound around a rotatable retractile drum 158 and the trailing end of the web is cemented thereto. The drum 158 is biased, in a clockwise direction as seen in Fig. 11, by a coiled spring which tends to rotate the drum in this direction and also acts to keep the wrapper web 156 taut at all times.

Fig. 12 shows a ticket form *t'* or other recording blank which has been wrapped, by means of a flexible web 156' around a forming cylinder 216, in order to wrap the blank into a cylindrical tube which extends axially beyond the end of the forming cylinder, and facing the observer as seen in Fig. 12, whereby a rotating electrical stylus may scan the inner surface of the extending portion of the tube for recording purposes. In the case of the recorder, it is not necessary that the cylindrical forming drum be composed of a transparent material, and preferably it is an open-ended metallic drum. As the recording blank *t'* is wrapped around the drum 216 the leading edge of the blank engages the pivot arm of a "paper-in" microswitch 248 to actuate the switch from one circuit controlling position (indicated by dotted lines) to another controlling position (shown in full line) to indicate the presence of the ticket form or other blank in the recorder.

Fig. 13 is a fragmentary view showing a "wrap" switch 46 and an "unwrap" switch 51 employed in the control circuits of the transmitter (a similar arrangement is employed in the recorder) for the purposes hereinafter referred to. These switches preferably are microswitches and their switch arms are actuated by a lobe on a cam 160 which is rotated by a gear train, including gears 162 and 164, from the wrap motor 40 (or a similar wrap motor in the recorder). Rotation of the forming cylinder or drum is effected by a gear 176, Fig. 13, which rotates the shaft of the cylinder; the gear 176 is driven by the wrap motor 40 through gears 162, 164 and 168. Rotation of the cylinder through an angle of approximately 380 degrees wraps the ticket or other blank into cylindrical or tubular form, and operates the wrap switch, such as the switch 46, at which time further rotation of the cylinder is prevented by the engagement of a pin 166 in the idler gear 168 with a fixed stop pin 172 mounted in a fixed collar 170, thereby stalling the wrap motor during the entire period of the scanning operation. The motor is of a type that is not injured by stalling.

When scanning is completed, the wrap motor is reversed by a local control circuit, and the idler gear 168 rotates in a reverse direction and this causes the pin 166 to leave stop pin 172 and rotate until it engages a fixed stop pin 174 mounted in the fixed collar 170, causing the wrap motor again to stall. The forming cylinder also has rotated in a reverse direction to unwrap the wrapper web and eject the ticket or other blank, and the wrapper mechanism is again in standby position for the insertion of a subsequent ticket or other blank.

In the transmitter the transparent forming cylinder and the transmitting blank rolled thereon are axially advanced, as indicated by arrows in Fig. 10, by a line-feed carriage relative to the optical scanning system to effect scanning, and thereby the rotating scanning light beam remains properly focused as a minute spot of light where it passes through the transparent wall of the cylindrical former and impinges on the inner surface of the rolled transmitting blank, whereas in the recorder the rotating stylus is advanced by a line-feed carriage along the inner surface of the axially extending tubular portion of the recording blank to effect scanning. Conventional line-feed carriage structure and means for advancing the structure may be employed in both the transmitter and recorder, but preferably the carriage is advanced by a drive chain which is continuously driven at a predetermined constant speed. Motion is imparted to the carriage by a magnetic clutch mounted on the carriage, in the manner disclosed in the aforesaid Wise and Zabriskie case; the magnetizing coil of the clutch is normally deenergized so that a sprocket mounted on the carriage and which engages the chain, normally idles, but when the clutch coil is energized by a control circuit in response to a start signal received over the line from the transmitter, the sprocket is prevented from idling and thus causes the carriage to be moved along by the chain for effecting line feed during a scanning operation.

The recording stylus usually comprises a fine tungsten wire approximately 8 mils in diameter, and it is desirable to keep the stylus in a retracted position except during a recording operation so that the stylus is not in the way of, or injured by, the tube forming operation of the recording blank, and any suitable means may be empolyed to effect this and to actuate the point of the stylus into contact with the inner surface of the tubular blank for recording purposes. Preferably, and in accordance with the aforesaid Wise and Zabriskie case, the stylus is automatically retracted and kept out of contact with the paper tube when it is being wrapped and also during the unwrapping operation, by the application of spring-tensioned brake structure which causes the stylus to be rotated to its retracted position. When the brake is released due to energization of a solenoid, or stylus brake coil, by a local control circuit, the stylus is rotated by a helical spring in a direction to cause the end of the stylus to engage the inner surface of the paper tube.

As hereinbefore stated, when a master ticket *t* or other transmitting form is wrapped around the transparent cylinder, the trailing end of the ticket or other transmitting blank extends past the leading end thereof by a slight amount, and this extending portion lies on top of the end of the loading platform and facilitates guiding the blank back onto the platform of the machine during an unwrapping operation. Similarly, the ticket form *t'* of Fig. 3 when wrapped around the forming cylinder of the recorder has a portion of the trailing end thereof extending past the leading end by a substantial distance so that this portion is not wrapped around the cylinder but lies on the end of the loading platform and guides the blank onto the platform during an unwrapping operation. It will be seen in Figs. 3 and 4 that the lower portion of the trailing end of the ticket form contains no indicia and therefore this portion is not subject to marking by the recording stylus. It is only necessary to record on the right-hand half of the ticket form *t'* and over a length thereof substantially equal to the length of the ticket *t* of Fig. 2.

*Detailed circuit description and method of operation*

Figs. 5 and 6 together show the circuit connections and elements of the fascimile transmitter T at the ticket control center of Fig. 1, and when explaining the functions of the reservation system, it will be understood that the local transmitter T' at the branch ticket office is identical thereto. Figs. 7 and 8 together show the circuit connections and elements of the facsimile recorder R at the branch ticket office of Fig. 1, and it will be understood that the local recorder R' at the ticket center is identical thereto. At the upper left-hand corner of Fig. 5 is diagrammatically indicated the local recorder R' at the ticket center, and at the upper left-hand corner of Fig. 7 is diagrammatically indicated the local transmitter T' at the branch ticket office, in order to show the interlocking circuits between the associated machines at each place. The recorders at both terminals are connected to the line L1, L2 at idle times.

*Transmission from branch ticket office.*—Let us assume that the agent at a branch ticket office desires to send a reservation request or other message to the control center. The message form is inserted in transmitter T' identical to the transmitter shown in Figs. 5 and 6 to which reference is now made. The message form is placed in the transmitter so that "paper-in" switch 20, Fig. 6, is operated by the sheet to cause the tongue and left-hand contact of the switch to close, and the "message" button 22 is depressed by the agent. A message relay MR, Fig. 5, is energized over a circuit extending from one side 24 of a 60 cycle, alternating current supply line, winding of relay MR, conductor 26, operated message button 22, tongue and left-hand contact of operated paper-in switch 20, conductor 28, armature 2 and associated break contact of relay RCR, left-hand contact and armature 3 of wrap relay WUR, to the other side 25 of the alternating current supply line. Armature 2 and associated make contact of energized relay MR cause a power relay PWR to operate over a circuit extending from power conductor 24, winding of PWR, conductor 34, closed contacts of a "coupon" button 32, conductor 30, armature 2 and associated contact of energized relay MR, conductor 26, closed contacts of message button 22, tongue and left-hand contact of actuated switch 20, conductor 28, armature 2 and associated contact of relay RCR, left-hand contact and armature 3 of relay WUR, to the other side 25 of the supply line. Relays MR and PWR are each locked up through its own armature 2 and make contact, the locking circuit extending from conductor 25, armature 3 and left-hand contact of relay WUR, armature 2 and right-hand contact of relay RCR, armature 2 and left-hand contact of operated relay PWR; at this point the locking circuit divides, one path leading to the coil of PWR and the other path being through conductor 34, normally closed contacts of "coupon" button 32, conductor 30 and armature 2 and left-hand contact of operated relay MR, and thus to the coil of MR. The operation of relay PWR, at its contacts 8, closes a circuit through conductors 15 and 16 and energizes a relay TCR' in the associated recorder R' thereby disconnecting its recording amplifier 269' from the lines L1 and L2.

Scanning motor 36 starts over a circuit extending from power conductor 24, motor 36, conductor 38, armature 6 and make contacts of relay PWR to the other side 25 of the power line. Wrap motor 40 starts over the same circuit that energized motor 36 and wraps the message blank around the transparent transmitting drum with the trailing end of the sheet overlapping the leading end, and with the subject-matter thereon facing inwardly. The field coil 41 of the wrap motor is also energized through a circuit from power conductor 24, armature 4 and right-hand contact of relay WUR, conductor 42, winding 41, conductor 44 which includes a 2 m.f.d. condenser 45, armature 2 and right-hand contact of relay WUR, armature 6 and left-hand contact of relay PWR to power conductor 25. When the message form has been wrapped around the drum, the wrap motor stalls and wrap switch 46 is operated to its closed position and remains closed during a scanning operation. The power relay PWR, at its armature 2 and make contact also supplies alternating current to a power rectifier unit 50 over a circuit comprising power conductor 25, armature 3 and left-hand contact of relay WUR, armature 2 and break contact of relay RCR, conductor 28, armature 2 and make contact of relay PWR, conductor 34 to the rectifier and return over conductor 54 to power conductor 24.

Metallic battery of 120 volts from the positive and negative terminals 56 and 57 of the energized rectifier 50 is applied to lines L1 and L2. Negative potential is applied through a circuit comprising armature 1 and associated right-hand contact of energized relay MR, the coil of scan relay TSR and its armature 1 and break contact, and break contact and armature 3 of a recorder control relay RCR to the line L1. Positive potential is applied through a circuit comprising armature 3 and associated right-hand contact of relay MR, a 2000 ohm variable resistor 58, contacts 3 of relay TSR, contacts 1 of relay RCR, conductor 60, and contacts 4 of relay PWR to line L2. Relay TSR is a marginal relay which does not operate at this time. It may here be noted that metallic battery is applied as a positive potential on line L2 when it is desired to transmit a message, and on line L1 when it is desired to transmit a ticket or coupon.

*Recorder.*—At the recorder R' at the ticket center, which is like the recorder of Figs. 7 and 8, positive voltage on incoming line conductor L2 is received over a circuit which includes contacts 2 of relay TCR, Fig. 7, left-hand winding of line relay LR2, a 5000 ohm resistor 220, selenium rectifier 224, contacts 1 of relay TCR, and line conductor L1 back to the transmitter at the ticket center, energizing the line relay LR2 of the recorder. The operation of this relay, at its armature 2 and associated make contact, causes a buzzer 228, Fig. 8, to sound, the circuit comprising conductor 240 of an alternating current power supply, armature 8 and break contact of start relay STR, conductor 238 to the buzzer 228, conductor 234, armature 5 and break contact of relay WUR, armature 2 and make contact of energized relay LR2, and conductor 232 to the other side 230 of the power source. The armature 2 and make contact of LR2 also cause energization of the "message" lamp 227 since the branch ticket office wishes to send a message and not a ticket or coupon; this circuit includes armature 2 and break contact of unoperated relay LR1, conductor 242 and message lamp 227 to the other side 240 of the power supply.

In response to the buzzer and message signal light, the clerk at the ticket center places a blank sheet of electrosensitive recording paper on the loading platform of the local recorder and operates a start button 222, Fig. 8. This establishes a circuit for the operation of the start relay STR, which circuit may be traced from one side 240 of the power supply, armature 6 and break contact of relay WUR, conductor 244, start button 222, conductor 246, armature 5 and make contact of operated relay LR2, and winding of relay STR to the other side 230 of the power supply. Relay STR operates and is locked up through its armature 2 and make contact, the locking circuit including conductor 244, and break contact and armature 6 of relay WUR. At its contacts 4, relay STR closes an operating circuit over conductors 17 and 18 and energizes a relay RCR' in the local transmitter T' thereby disconnecting its modulator 64' from the lines L1 and L2. The stylus motor 236 is energized over a circuit from power conductor 230, through the motor armature, conductor 250, contacts 252 of a commutator 255, conductor 248, make contact and armature 8 of operated relay STR, to power conductor 240. A reversible wrap motor 214 also is energized, in a direction to effect a wrapping operation of the recording blank around the tube-forming cylinder, over a circuit which comprises power conductor 230, through the motor armature, conductor 253, armature 8 and make contact of operated relay STR, to power conductor 240. The direction of rotation of the reversible motor 214 is determined by which two conductors of the group 296, 297 and 298 are connected together by armature 4 of relay WUR; with the relay deenergized the conductors 296 and 297 are connected together and the motor rotates in a direction to wrap.

In the complete unwrapped, or standby, position of the apparatus, the contacts of unwrap switch 237 are in the open position, as shown, but close as soon as wrapping starts and remain closed until a subsequent unwrapping operation is completed. At the completion of a wrapping operation, the tongue of wrap switch 235 is operated from its upper contact to its lower contact, and remains in that position during a recording operation since the wrap motor is stalled at this time; when the wrap motor reverses for an unwrapping operation the tongue of the wrap switch returns to its upper contact. During the wrapping operation, "paper-in" switch 248 operated to its lower contact so that when the blank is wrapped completely and the wrap switch 235 is operated to its lower contact, a delay relay DLR, Fig. 7, is energized over a circuit which includes the winding of the relay, conductor 256, lower contact and blade of the operated paper-in switch 248, lower contact and blade of operated wrap switch 235, conductor 253, make contact and armature 8 of operated relay STR to conductor 240. Armature 2 and make contact of energized relay DLR energizes a stylus brake magnet 255, Fig. 8, and releases the stylus 239 to enable it to contact the rolled recording blank *b* for a recording operation; the circuit includes the make contact and armature 2 of DLR, conductor 260, brake winding 255, an end-of-message switch 257, wrap switch 235, conductor 253, and armature 8 and make contact of relay STR to conductor 240.

*Phasing.*—At its armature 3 and break contact the energized relay DLR removes ground from a conductor 265 that extends to a diode in the phasing amplifier 267 of Fig. 8 (disclosed in detail in Fig. 9, and hereinafter described); removal of this ground causes the phasing amplifier to be set up for phasing. This arrangement insures that phasing cannot take place until the recording blank is completely wrapped and the scanning motor is up to synchronous speed. There are various methods employed for phasing facsimile transmitters and recorders. Electronic phasing between the transmitter and recorder is accomplished by the comparison of time positions of phasing pulses generated by both the transmitter and recorder. In both instances the pulses, which may be called horizontal framing pulses, are generated by inducing a voltage across pickup coils, such as the coil 38 of the transmitter, Fig. 6, and the coil 38' of the recorder, Fig. 8, by means of an Alnico magnetic slug 39 or 39' fixed to the rotating armature shaft of each of the 1800 r.p.m. salient pole, synchronous scanning motors 36 and 236. Thus a pulse is generated once per revolution at a particular angular position of each motor shaft. By establishing, during the line-up procedure, that the positions of the magnetic slugs 39 and 39' fixed to the armature shafts of the scanning motors at the transmitter and recorder, at which phasing pulses are generated, are at the correct phase positions in respect to a particular angle of current flow through the motors, it becomes necessary only to have means to allow both pulses to occur simultaneously and provide a method of automatically locking the system in this state. The proper angular positions of the magnetic slugs with respect to the angle of current flow through each of the motors is readily accomplished by observing the voltage output of the phasing pulse pickup coil when connected to an oscilloscope in series with the alternating current supply line to the motor, and adjusting the angular position of the slug on each of the motors until their polar coordinate positions are identical.

The phasing pulses received from the transmitter are bursts of carrier current generated in the modulator 64 of the transmitter; various of the circuit elements of the modulator are shown in Fig. 10 to which reference will now be had, and which discloses a balanced modulator and associated amplifier circuits, a pulse amplifier and multivibrator unit and a changeover relay. The pulse amplifier and multivibrator unit is diagrammatically indicated at 70 in the figure, the changeover relay is indicated by numeral 72, and the carrier oscillator is indicated at 74. When the message at the branch ticket office is wrapped around the transparent drum 76 and the scanning motor 36 is running, phasing pulses generated by the magnetic slug 39 and pickup coil 38 are amplified and inverted, and then used to trigger a monostable multivibrator in the unit 70.

The multivibrator serves to sharpen the edges of the pulses and also, because it contains an adjustable *R/C* timing circuit to lengthen the pulse width, the same modulator chassis is usable when a longer phasing pulse is needed, as in 360 r.p.m. equipment, or when extended blanking areas are required. These pulses from the unit 70 appear on the break contact and armature 3 of the relay 72. The signal contacts 1 of the relay are normally open, so that before the changeover relay 72 operates only phasing pulses appear at the input to the modulator diodes 78, these pulses being applied through a coupling capacitor 82 and a cathode follower VT2A to the center tap of the modulator input resistor 90 connected across oscillator transformer 92. A diode 86 connected to the grid of VT2A acts as a D.C. restorer to clamp the phasing pulses to a fixed reference level which was lost when the pulses were coupled through the capacitor 82. When the changeover relay 72 operates, as hereinafter explained, the phasing pulses are removed from the input to the modulator diodes 78 and signals over conductor 126 generated by the intelligence scanned are substituted.

The motors used in the transmitter and recorder at each station are of the 1800 r.p.m. salient pole synchronous type and therefore have four possible pole positions in which they may be phased with respect to each other. The motors are operated from a common source of 60 cycle, 120 volt power supply, or from separate sources in exact synchronism. Only one of these four positions is correct for a given position of the other motor. By allowing the recorder motor 36 to slip exactly one pole position at a time and keeping the transmitter motor 36 running continuously at synchronous speed, a condition is established that causes exact phase orientation of both motors. When this correct orientation is reached, pulses from both motors are generated simultaneously. Slipping of the recorder motor one pole at a time is accomplished by interrupting its power circuit, for a time equal to approximately 35 milliseconds, once every 15 revolutions, by the action of the motor driven commutator 255, Fig. 7, which controls the contacts 252 of the microswitch, the commutator drive being supplied by a 120 r.p.m. synchronous motor 251.

*Phasing coincidence pulse circuit.*—Referring to Fig. 9, the phasing pulses incoming from the distant transmitter pass through transformer 310 and are amplified by a section V1A of an amplifier tube, and detected by a section V5A of a diode tube. A filter comprising a resistor 316 and a capacitor 317 removes most of the carrier frequency, thus a negative going pulse appears at the left-hand control grid of a coincidence tube V2. Each local phasing pulse generated by the recorder is connected over conductor 261 through the diode 315 to the grid of the right-hand section of the tube V2; the diode prevents any positive excursions of this pulse. When the phase position of the Alnico slugs on both the transmitter and recorder motors is identical, pulses will arrive at the grids of the two sections of the coincidence tube V2 simultaneously, and if at this time further interruption of the recorder motor 236 is stopped, the transmitter and recorder will continue to run in phase and the recorded message will be properly framed. The coincidence tube V2 is normally conducting, and the arrival of negative pulses on either grid serves to cut off the plate current flow in the respective sections, thereby raising the voltage at the plates of this tube and the anode of the diode V5B. The cathode of this diode is connected to a positive bias voltage by a potentiometer 322, and this voltage is adjusted so that the diode will not conduct on the rise of plate voltage at V2 due to either phasing pulse alone. When the pulses arrive in coincidence, however, tube V2 will be cut off, its plate voltage will be high, and diode V5B will conduct a large positive output coincidence pulse to appear at the grid of tube section V1B. A capacitor 326 blocks the direct current from the grid of tube V1B, and a diode 318 restores the reference level to ground.

Since the recorder stylus motor is interrupted twice per second, it can be seen that if the motor slipped one pole instantaneously, as many as 15 coincidence pulses would be generated while the scanning motors ran synchronously at any pole position, that is:

$$1800\text{ r.p.m.}=\frac{30\text{ r.p.s.}}{2\text{ interruptions}}=15\text{ revolutions}=15\text{ pulses}$$

This is according to plan and an integrating circuit including a charging capacitor is used to add several of these pulses to an amplitude which will be large enough to fire a phasing relay tube V3, preferably a Thyratron. The integrating circuit acts as a safety device so that a severe line hit or a local transient, if occurring in coincidence with one or the other of the phasing pulses, can not fire the Thyratron. When V3 fires, it energizes phasing relay PH over a circuit comprising conductor 266, winding of the phasing relay, make contact and armature 6 of operated relay STR to positive battery. Contacts 7 of relay PHR short-circuit the interrupting commutator contacts 252 thereby providing uninterrupted power over conductor 250 to the stylus motor, thus locking the system in phase. Tube V1B of Fig. 9 is a cathode follower used to charge the integrating circuit comprising resistance 334, diode V5, and charging capacitor 336. The thyratron V3 is biased to several times cutoff by the positive cathode voltage provided by the potentiometer 340 and resistance 342, so that it will not fire until several coincidence pulses have been added on the capacitor thereby overcoming the Thyratron bias. Relay contacts 3 of DLR are used to apply ground over conductor 265 to the integrating circuit at the junction of resistance 334 and the anode of diode V5C, so that no voltage can appear until after the recorder is up to speed and the blank is completely wrapped.

Relay PHR is locked through its preliminary make contacts 1, and through conductor 264 operates the carriage feed clutch 265, causing scanning by the stylus 239 to take place. At its armature 4 and break contact, relay PHR removes ground from the stylus circuit 259. Relay PHR establishes a locking circuit for relay LR2. The circuit extends from one side 230 of the alternating current supply, conductor 270, make contact and armature 5 of PHR, conductor 272, rectifier 280, resistance 282, right-hand (locking) winding of line relay LR2, break contact and armature 5 of relay LR1, armature 5 and make contact of operated relay LR2, make contact and armature 2 of operated relay STR, conductor 244, break contact and armature 6 of relay WUR to conductor 240 of the alternating current supply line, thus locking relay LR2 energized. Because of half-wave rectification of this circuit by the rectifier 280, and the fact that relays LR1 and LR2 act as transformers, capacitors 284 are connected across the coils of these relays to remove the 120 cycle ripple. Capacitors 285 are part of the filter circuit of rectifier 280.

Armature 9 and make contact of energized relay PHR short out a one microfarad capacitor 312 in the phasing amplifier 267 (which capacitor normally separates the lines L1 and L2 and windings 311 of the transformer coil) thereby increasing the normal line current of 15 ma. to approximately 45 ma. This increase in current operates the scan relay TSR, Fig. 5, at the branch office transmitter, which relay at its contacts 1 and 3, removes the source of metallic battery 56, 57 from lines L1 and L2, and at its contacts 4 applies battery to conductors 84 and 85 and causes operation of a scanning carriage line feed clutch 100 and the changeover relay 72 in the modulator 64 of the transmitter; this starts the scanning operation and removes the phasing pulses and causes the facsimile message signals to be transmitted over the line to the recorder, where they are amplified by the recording amplifier 269 and applied over conductor 259 to the stylus.

*Transmission of intelligence signals.*—Referring again to Fig. 10, the message blank *t* was wrapped around the transparent drum 76 with the trailing end of the blank overlapping the leading end, and subject-matter copy thereon facing inwardly, due to the operation of the wrap motor. The sheet is scanned from the inside by a mirror 102 mounted on the shaft of the scanning motor 36 and rotated by the motor at 1800 r.p.m. A converging light beam, diagrammatically indicated at 104, is obtained from an exciter lamp 106 through a condenser lens 108; the light beam is focused as a light spot of about 8 mils diameter onto the copy on the sheet by means of the lens 108, a fixed 45° angle mirror 110 and the rotating mirror 102. The light spot is rotated around the inside of the cylinder of copy by the mirror 102. Reflected light from the copy is picked up by this same rotating mirror, and is brought out of the end of the drum as a reflected diverging light beam, indicated at 112, which passes around the edges of mirror 110 and is focused by a short-focus lens 114, such as Fresnel lens, onto the cathode of a photomultiplier tube 116. The photomultiplier tube may be a conventional 931 type and the light signals, which comprise variations of reflected light from the copy being scanned, are amplified by the photomultiplier to provide a signal voltage swing as high as 20 to 30 volts across its anode load resistor. A cathode follower is used to bring these signals down to the associated modulator on a low-impedance basis. A preamplifier unit 122 contains a small high voltage power supply (not shown) and the cathode follower. Fig. 6 shows the circuit arrangement involving the photomultiplier tube 116, anode load resistor 118, cathode follower 120, and a potentiometer 124 through which the intelligence and background signals are applied to a conductor 126 leading to the modulator circuit.

Referring again to Fig. 10, the changeover relay 72 has operated and at its contacts 1 the phasing pulses (which occur at the overlapped portion of the message sheet *t*) are removed from the input 90 of the modulator diodes 78, and the intelligence and background signals (indicated by the signal voltage form *i*) are substituted therefor. Also, contacts 3 of relay 72 apply the pulses, which formerly were phasing pulses, to a conductor 128 whereby these pulses are applied, through the right-hand section of a cathode follower VT2B and a midpoint tap on the primary winding of a transformer 130, to the cathode side of the modulator. Now, when positive phasing pulses are connected to the cathodes of the modulator diodes 78 and if these pulses are equal to, or greater in amplitude than the pulses of intelligence which are now on the anodes of the diodes, no modulated carrier can appear at the output, and any intelligence or background scanned during the phasing pulse duration is not transmitted. To insure freedom from drift and to limit unbalance and frequency discrimination due to distributed capacitance and so forth, a low-impedance modulator is used.

Figure 2:
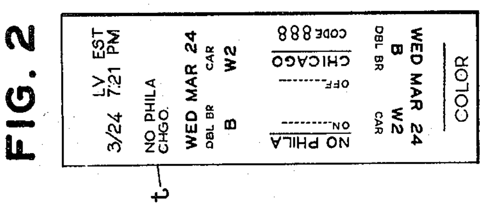
Fig. 2 shows a Pullman ticket, or coupon, from which facsimile signals are transmitted at the control center to effect validation and issuance of a ticket form at a branch ticket office.
Figure 3:
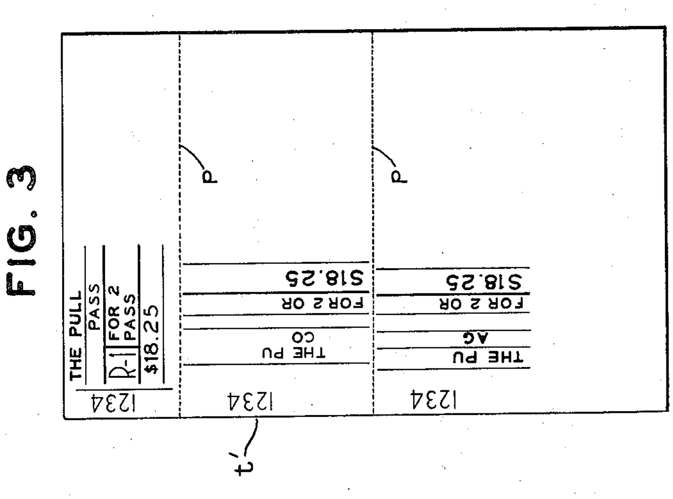
Fig. 3 shows an electrosensitive recording ticket form, having certain preprinted data on one area thereof and having a blank area for receiving the facsimile signals to effect validation and issuance of the ticket form.

*Suppression of facsimile intelligence or background signals when scanning certain areas of a ticket.*—The phasing pulses above described are ordinarily employed for the production of blanking signals at the line where the trailing portion of a ticket or other transmitting blank overlaps the leading portion thereof, thereby to prevent the pickup photocell 116 from transmitting unwanted signals at this point which would cause an unsightly line to appear on the recording blank at a receiving station. The arrangement of Fig. 10, however, prevents facsimile intelligence or background signals from being transmitted when scanning certain areas of a ticket, coupon or other message. While this is not necessary when transmitting from a message form such as that employed by the agent at the branch ticket office for transmitting a request or inquiry to the ticket control center, nevertheless it is of substantial importance in transmitting signals from a ticket or coupon such as shown in Fig. 2, and while we are considering the circuit of Fig. 10 it will be convenient to discuss the features thereof when transmitting from a ticket or coupon. Different classes of tickets or coupons such as the ticket *t* of Fig. 2 are differently priced and, as hereinbefore stated, to facilitate the selection of a proper ticket at the ticket control center, areas of different colors for different classes are preprinted on the bottom thereof in the space indicated by the word COLOR in Fig. 2. It is desirable to prevent intelligence or background signals from being transmitted when scanning the colored area or a portion thereof, and the circuit of Fig. 10 is designed to prevent this, as follows:

In the balancing side of the modulator there is provided a cathode follower VT2B, and a contrast control circuit comprising potentiometer 133, diode 87 and resistor 134 connected to the grid of VT2B. The diode serves to clamp the grid of VT2B to the positive bias value determined by contrast control potentiometer 133. The cathode follower, which is always conducting, is connected to the midpoint of the primary winding of output transformer 130. Pulses which formerly were phasing pulses are now employed as suppression pulses supplied from the multivibrator, by the operation of the changeover relay, and are applied over conductor 128 and through a capacitator 135 to the grid of the cathode follower. The resistance 134 which is of high value, for example, 100,000 ohms, provides a relatively long time discharge path for the capacitator 135 and thus is operative to increase and maintain increased the conductivity of VT2B for a desired time interval, thereby raising the positive bias on the cathodes of the modulator diodes 78 for this interval and suppressing the output of the modulator for an interval corresponding to that required for scanning across the colored end portion of the ticket during each revolution of the scanning light beam. The diode 87 functions to clamp the negative excursions of the suppression pulses to the value set by the contrast control 133. Since the modulator employed is a low impedance circuit and since the cathode followers feeding the input and output of the modulator are also low impedance devices, the circuitry employed enables the equipment to be operated at both low and high scanning speeds without frequency discrimination.

In order to provide a high degree of linearity for large and small input levels, the modulator diodes 78 are operated at high bias and signal amplitudes. Since this type of operation causes considerable higher order harmonics to be generated, a filter (not shown) is used in the output of the modulator. Such a filter is of a band-pass type and thus it also attenuates modulation frequencies which may be present in the output due to modulator unbalance. In practice, the output of such a modulator filter is fed into an attenuation equalizer and from there through amplifier stages indicated at 80, and thence through a transformer 142 and through the various control circuits indicated diagrammatically at 144 to the line conductors L1 and L2.

*Completion of recording operation.*—Referring again to Figs. 7 and 8, when the incoming message has been scanned by the recorder, the end-of-message switch 257 is operated momentarily by the stylus carriage and this causes relay WUR to be energized over a circuit including conductor 270, winding of the relay, conductor 288, right-hand contact and tongue of actuated end-of-message switch 257, wrap switch 235, conductor 253, make contact and armature 8 of energized relay STR, to conductor 240 of the supply line. Relay WUR operates and locks through its armature 2 and make contact, the locking circuit including conductor 290, end-of-message button 305 and power conductor 240. The contacts of the unwrap switch 237 bridge the contacts of the end-of-message button 305 until the completion of the unwrap operation, at which time relay WUR at its armature 6 and break contact opens the locking circuit of relay STR which releases. The release of STR, at its contacts 6, releases phasing relay PHR and hence the carriage feed clutch 265, allowing the carriage to be returned by a coiled spring to its start position in known manner. Armature 4 and make contact of relay WUR connect together conductors 297 and 298, and cause the wrap motor 214 to reverse and unwrap and discharge the recording blank back onto the loading platform of the recorder. An end-of-message lamp 301 is energized from the power supply line 239 over a circuit including the lamp, conductor 288, make contact and armature 2 of relay WUR, conductor 290, end-of-message button 305, and conductor 240. The buzzer 228 also is sounded over a circuit which includes make contact and armature 5 of energized relay WUR, conductor 234, through the buzzer, conductor 238, and break contact and armature 8 of deenergized relay STR to conductor 240. Operation of the end-of-message button 296 releases relay WUR, extinguishes the lamp 301, and stops the buzzer 228.

In the event that the recorder should be started without a recording blank or ticket form in position for wrapping, the recorder will go through a wrapping cycle, and at the completion of the wrapping cycle the wrap switch 235 will be operated to its lower contact. Operation of this switch, through the closed contacts of the unoperated paper-in switch 248 will cause relay WUR to be energized over a circuit comprising conductor 288, paper-in switch, wrap switch 235, conductor 253, and make contact and armature 8 of energized relay STR to conductor 240, thus unwrapping the wrapper web and lighting the end-of-message light 301 and sounding the buzzer 228. The failure of the paper-in switch to operate prevented relay DLR from operating which, in turn, prevented phasing operations, and thus provides a revertive control to the transmitter so that it can not transmit unless and until the recording blank or ticket form has been wrapped and in position to receive incoming intelligence signals.

In the event that the clerk notices that he had inadvertently inserted the wrong kind of recording blank, or that some trouble should arise in the machine, he can depress a release button 344, Fig. 8, which will energize the WUR relay over a circuit extending from power conductor 270, through the coil of WUR, conductor 288, closed contacts of the depressed release button, tongue and lower contact of wrap switch 235, conductor 253, and armature 8 and closed contact of relay STR to power conductor 240. The result of the operation of relay WUR is the same as hereinbefore described when the end-of-message switch was actuated.

*Completion of transmitting operation.*—Scanning is a local operation at each terminal, and at the transmitter, Figs. 5 and 6, the momentary operation of an end-of-message switch 35 by the scanning carriage causes a relay WUR to operate over a circuit extending from power conductor 24, winding of the relay, conductor 47, end-of-message switch 35, wrap switch 46, conductor 38, and contacts 6 of relay PWR to the power conductor 25. Relay WUR locks up through its contacts 1, conductor 48, and contacts of an end-of-message button 49 to power conductor 25, and energizes an end-of-message lamp 43. Armatures 2 and 4 and the associated left-hand contacts of WUR reverse the conductors 42 and 44 leading to the field coil 41 of the wrap motor 40 and cause the motor to reverse and unwrap the transmitting blank. The agent then presses the end-of-message button 49 to open its contacts and release relay WUR and extinguish the end-of-message lamp 43.

Should the agent or clerk inadvertently insert the wrong request form or other message in his transmitter T′, or if trouble should develop in the machine, he may depress a release button 94, Fig. 6, which will energize the WUR relay in the manner of the end-of-message switch 35 above described. The relay WUR locks up and causes the wrap motor 40 to reverse and unwrap the request form or message, after which the end-of-message button is depressed in order to release relay WUR.

Figure 4:
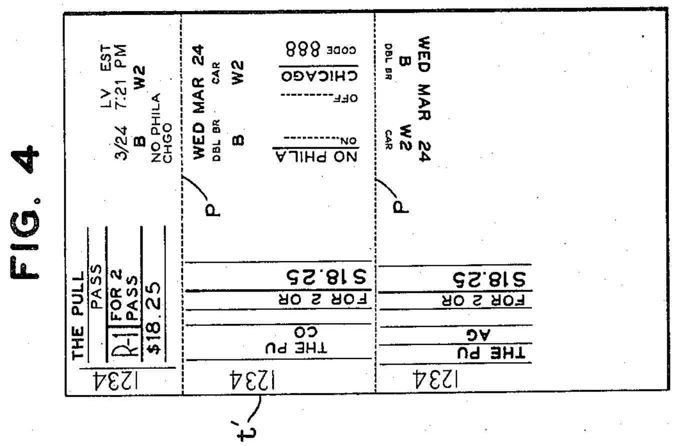
Fig. 4 shows the ticket form of Fig. 3 after it has been validated by the received signals from the ticket center.

*Transmission from ticket center.*—Assuming the requested reservation is available, the clerk at the ticket center will properly mark a master ticket or coupon *t* like the one shown in Fig. 2, and insert it in his transmitter and press the coupon button 32. This causes positive battery 56, Fig. 5, to be applied to the line L1 and negative battery 57 to be applied to the line L2. Since relay MR did not operate, this results in the operation of line relay LR1 at the recorder in the branch ticket office, whereupon the coupon lamp 302, Fig. 8, is lit over conductor 306 and armature 2 and left-hand contact of energized relay LR1. The agent thus is advised to insert a pre-printed ticket form *t′* like the form shown in Fig. 3 in his recorder in order to obtain a validated ticket form such as shown in Fig. 4. The sequence of operations involved when transmitting the facsimile signals from the master ticket is the same as that heretofore described with reference to transmitting from the branch ticket office transmitter. If the desired reservation is not available the ticket center clerk will write a message to such effect, and usually suggest other available space, on a message form, insert the message form in his transmitter and press the message button 22, whereupon the agent at the branch office will insert a plain electrosensitive recording blank in his machine to receive the information.

*Automatic answer provision at recorder.*—An automatic answer provision at each recorder enables the automatic answering of an incoming call. This is effected by a switch 292, Fig. 8, the handle of which is an extension on the armature of an associated relay coil 304. Operation of the switch to its closed position causes energization of the relay coil which locks the switch through its own contacts 6, the locking circuit including conductor 230, coil 304, associated make contact and armature 6, conductor 307, conductor 244, and break contact and armature 6 of relay WUR to conductor 240. After placing a sheet of recording paper or a ticket form to be printed on the recorder, as the case may be, the switch 292 is manually moved to its closed position above described. The switch may be restored to its off position manually if desired. Make contact and tongue 4 of switch 292 when actuated place a short across the start button 222, by means of conductors 300 and 307, so that when the incoming call operates either relay LR1 or LR2, relay STR will be energized (the buzzer does not sound) and the blank is wrapped and the sequence is started.

The local transmitter T′, Fig. 7, will be disconnected from the transmission circuit by means of contacts 1 and 3 of relay RCR′ of the local transmitter, whenever the relay is energized. Relay RCR′ is energized either by the closure of contacts 4 of start relay STR, or by the closure of contacts 1 of line relay LR1 or LR2, in response to an incoming call from the distant transmitter. Operated relay RCR′, referred to as RCR in Fig. 5, also opens the energizing circuit of the local transmitter power relay PWR so that if the start button in the local transmitter, i.e., the message button 22 or the coupon button 32, is inadverently closed when an incoming call is present, the local transmitter cannot start. These interlocking features insure that if a transmitter at one of the stations is set up for transmitting a message to the recorder at the other station, the transmitter at the other station cannot be started by depression of the start button 22 or 32, and this avoids any possibility of losing an incoming message due to the inadvertent attempt to start the transmitter.

For brevity in the claims, when referring to a reservation system the term "ticket" is employed to designate tickets, coupons and the like from which validating signals are transmitted as distinguished from a "request form" or "message" relating to a reservation or other information, and the term "ticket form" designates a recording blank having an area thereon for receiving the validating signals transmitted from a "ticket." Also, wherever applicable, the term "transmitting blank" is employed in the claims in a generic sense to designate various types of subject-matter blanks, and the term "recording blank" is similarly employed to define various types of recording blanks.

While the embodiment of the invention illustrated herein is particularly adapted for the reservation and sale of tickets of different types, it will be understood that various of the features disclosed are applicable to facsimile systems for general purposes, and irrespective of whether inside or outside scanning methods are employed or whether drum or flat-bed machines are utilized, particularly in regard to the signaling, control and phasing operations, and that various changes and modifications may be made without departing from the spirit of the invention which is not to be regarded as limited except as indicated by the scope of the appended claims.

What is claimed is:

1. A facsimile system comprising a transmitter and a recorder and a transmission circuit for interconnecting the transmitter and recorder, said transmitter and recorder respectively having drums and wrapper means coacting therewith for wrapping transmitting and recording blanks around the drums in position for scanning operations, and having wrap motors for rotating said drums in one direction to wrap the blanks and for rotating the drums in the opposite direction to unwrap the blanks, said transmitter having a scanning system including a scanning element and a scan motor for rotating said element to scan the subject matter on a wrapped transmitting blank to produce facsimile message signals, and said recorder having a scanning system including a scanning element and a scan motor for rotating said element to scan a recording blank for recording an incoming message, electrical start contacts at said transmitter and circuit means responsive to the actuation of said contacts for energizing its wrap motor in a direction to wrap a transmitting blank and also for energizing its scan motor preparatory to a scanning operation, means also responsive to the actuation of said start contacts for sending a signal over the transmission circuit to said recorder to indicate that a message is to be transmitted, said recorder having start contacts and circuit means responsive to the actuation of the last named contacts for energizing its wrap motor in a direction to wrap a recording blank and for energizing its scan motor preparatory to a scanning operation, and means including contacts automatically operative upon the completion of the scanning operations at the transmitter and recorder, respectively, for causing the wrap motors to rotate said drums in said opposite direction to unwrap and eject said blanks.

2. A system according to claim 1, and including revertive control circuit means operative to prevent said transmitter from scanning a transmitting blank wrapped therein unless the recorder has a recording blank wrapped in position to receive incoming facsimile message signals, said circuit control means including a switch member actuatable by a recording blank when it is wrapped around its drum.

3. A facsimile system comprising a transmitter and a recorder and a transmission circuit for interconnecting the transmitter and recorder, said transmitter having a transparent drum and wrapper means coacting therewith for wrapping a transmitting blank around the drum in position for inside scanning operations, said recorder having a drum and wrapper means coacting therewith for wrapping a recording blank in tubular form with a length of the formed tube extending axially from said drum for inside scanning operation, reversible wrap motors for rotating said drums in one direction to wrap the blanks and for rotating the drums in the opposite direction to unwrap the blanks, said transmitter having an optical scanning system including a scanning element within its transparent drum and a scan motor for rotating said element to scan the subject matter on the inner surface of the wrapped transmitting blank to produce facsimile message signals, and said recorder having a scanning system including a recording stylus and a scan motor for rotating said stylus within said extending length of the formed tube to scan the inner surface thereof for recording an incoming message, electrical start contacts at said transmitter and circuit means responsive to the actuation of said contacts for energizing its wrap motor in a direction to wrap a transmitting blank and also for energizing its scan motor preparatory to a scanning operation, means also responsive to the actuation of said start contacts for sending a signal over the transmission circuit to said recorder to indicate that a message is to be transmitted, said recorder having start contacts and circuit means responsive to the actuation of the last named contacts for energizing its wrap motor in a direction to wrap a recording blank into tubular form and for energizing its scan motor preparatory to a recording operation, and means including contacts automatically operative upon the completion of the scanning operations at the transmitter and recorder, respectively, for reversing the wrap motors to cause said blanks to be unwrapped and ejected.

4. A facsimile system comprising a transmitter and a recorder and a transmission circuit for interconnecting the transmitter and recorder, said transmitter and recorder respectively having drums and wrapper means coacting therewith for wrapping transmitting and recording blanks around the drums in position for scanning operations, and having wrap motors for rotating said drums in one direction to wrap the blanks and for rotating the drums in the opposite direction to unwrap the blanks, said transmitter and recorder having loading platforms on which the blanks are placed preparatory to the wrapping operations, a switch member extending through an opening in said loading platform of the transmitter and actuatable by a transmitting blank when placed on the loading platform in position for a wrapping operation, said transmitter having a scanning system including a scanning element and a scan motor for rotating said element to scan the subject matter on a wrapped transmitting blank to produce facsimile message signals, and said recorder having a scanning system including a scanning element and a scan motor for rotating said element to scan a recording blank for recording an incoming message, electrical start contacts at said transmitter and circuit means responsive to the actuation of said contacts, and under control of said switch member, for energizing its wrap motor in a direction to wrap a transmitting blank and also for energizing its scan motor preparatory to a scanning operation, means also responsive to the actuation of said start contacts for sending a signal over the transmission circuit to said recorder to indicate that a message is to be transmitted, said recorder having start contacts and circuit means responsive to the actuation of the last named contacts for energizing its wrap motor in a direction to wrap a recording blank and for energizing its scan motor preparatory to a scanning operation, means including contacts automatically operative upon the completion of the scanning operations at the transmitter and recorder, respectively, for causing the wrap motors to rotate the drums in the opposite direction to cause said blanks to be unwrapped and ejected, said recorder having switch means manually operable to a position to provide an automatic start feature and circuits controlled thereby to cause a recording blank previously placed on the loading platform to be wrapped for a scanning operation in response to said signal from the transmitter.

5. A facsimile system comprising a transmitting station having a transmitter and a receiving station having a recorder and a transmission circuit for interconnecting the stations, said transmitter and recorder each having a scanning system including a scanning element and a synchronous scan motor for actuating the scanning element, a source of synchronous supply current for driving said motors and a phasing circuit for establishing exact phase orientation of said scanning elements, said phasing circuit comprising means for generating phasing pulses at the transmitter and recorder once during each scanning line defined by the scanning elements at a particular instantaneous position of the scanning elements, means for transmitting to one of the stations the phasing pulses generated at the other station, timing means for affecting the synchronous supply current applied to the scan motor at said one of the stations at a rate to cause its armature to slip one pole position at a time while the scan motor at the other station continues to run synchronously, a coincidence circuit responsive to said phasing pulses and including means operative when a succession of phasing pulses from the transmitter and recorder arrive in exact coincidence for producing coincidence pulses, means for preventing line hits or local transients from affecting proper phasing comprising an integrating circuit operative to produce a control pulse only in response to a plurality of said coincidence pulses, and means responsive to said control pulse for preventing said timing means from affecting the synchronous supply current supplied to the scan motor at said one of the stations and thereby cause the scan motor to run in synchronism and actuate the scanning element in exact phase orientation with the scanning element at said other station.

6. A system according to claim 5, in which said coincidence circuit comprises a bias-controlled conductive device and means for applying biasing potential thereto, means for causing the phasing pulses from the transmitter and recorder respectively to be applied to said device, a second bias-controlled conductive device coupled to the output of said first device, means for applying to said second device biasing potential of a value to prevent it from reaching a conductive state to produce an output pulse when the output of said first device is due to either phasing pulse alone but which will cause said second device to produce an output pulse when the output of said first device is due to phasing pulses arriving in coincidence, and means for applying the coincidence output pulses from the second device to an integrating circuit which is operative to produce a control pulse only when a plurality of the coincidence pulses are added to reach a predetermined amplitude.

7. A system according to claim 5, in which the armature of each scan motor has a plurality of possible phase positions and in which only one of the phase positions of either motor armature is correct in respect to the phase position of the other motor armature, and in which said phasing circuit comprises means for generating phasing pulses at the transmitter and recorder once during each revolution of the scan motors at the same particular angle of current flow through the motors.

8. A facsimile system comprising a transmitter and a recorder and an interconnecting pair of line conductors, means including scan motors at the transmitter and recorder respectively for scanning transmitting and recording blanks, means at the transmitter for applying phasing pulses to said line conductors for phasing said scan motors, the recorder having a signal input transformer, a blocking capacitor in series with the primary winding of said input transformer, means including a signaling circuit at the transmitter for applying direct current to said line conductors to transmit a signal to the recorder to indicate there that it is desired to transmit from a transmitting blank, said signaling circuit at the transmitter including a marginal relay that does not operate on the line current which obtains at such time, means including a relay at the recorder operative when phasing has been accomplished and a circuit controlled thereby for shorting out said blocking capacitor and increasing the line current to a value to cause operation of said marginal relay, and circuits controlled by the operation of the marginal relay for removing the direct current from said line conductors and initiating a scanning operation.

9. A facsimile system comprising a transmitter and a recorder and a transmission circuit for interconnecting the transmitter and recorder, said transmitter and recorder respectively having elements for scanning transmitting and recording blanks and means including scan motors for rotating the scanning elements, means for generating phasing pulses at the transmitter and recorder, means for applying the phasing pulses generated at the transmitter to the transmission circuit, means at the recorder responsive to said phasing pulses received over the circuit and to the phasing pulses generated at the recorder for establishing phase orientation of both scanning elements, means operative when phasing is accomplished for removing the phasing pulses from the transmission line and applying thereto the facsimile intelligence signals generated by said scanning element of the transmitter, and means for preventing the transmission of said intelligence signals when scanning a certain predetermined area of the transmitting blank, comprising a supression circuit including means for applying said phasing pulses as suppression pulses thereto when said phasing is accomplished, said suppression circuit being responsive to said last named pulses and operative to prevent the transmission of intelligence signals for an interval corresponding to that required for scanning across said predetermined area of the transmitting blank.

10. A facsimile system comprising a transmitter and a recorder and a transmission circuit for interconnecting the transmitter and recorder, said transmitter and recorder respectively having elements for scanning transmitting and recording blanks and means including scan motors for rotating the scanning elements, means for generating phasing pulses at the transmitter and recorder once during each revolution of the scan motors, means including a changeover relay operative in a first position to apply the phasing pulses generated at the transmitter to the transmission circuit, means at the recorder responsive to said phasing pulses received over the circuit and to the phasing pulses generated at the recorder for establishing phase orientation of both scanning elements, means operative when phasing is accomplished for actuating said changeover relay to a second position for removing the phasing pulses from the transmission line and applying thereto the facsimile intelligence signals generated by said scanning element of the transmitter, and means for preventing the transmission of said intelligence signals when scanning a certain predetermined area of the transmitting blank, comprising a suppression circuit including means for applying said phasing pulses as suppression pulses thereto when said changeover relay is operated to its second position, said suppression circuit being responsive to said last named pulses and operative to prevent the transmission of intelligence signals for an interval corresponding to that required for scanning across said predetermined area of the transmitting blank.

11. A facsimile system comprising a transmitter and a recorder and a transmission circuit for interconnecting the transmitter and recorder, said transmitter and recorder respectively having elements for scanning transmitting and recording blanks and means including scan motors for rotating the scanning elements, means for generating phasing pulses at the transmitter and recorder once during each revolution of the scan motors, said transmitter having an oscillator followed by a balanced modulator, means for applying the phasing pulses generated at the transmitter as positive going pulses to the input side of said modulator to cause it to supply phasing carrier pulses to the transmission circuit, means at the recorder responsive to said phasing pulses received over the circuit and to the phasing pulses generated at the recorder for establishing phase orientation of both scanning elements, means operative when phasing is accomplished for removing the phasing pulses from the input side of the modulator and applying thereto the facsimile intelligence signals generated by said scanning element of the transmitter for modulating the carrier, and means for preventing the transmission of facsimile signals when scanning certain predetermined areas of the transmitting blank comprising a suppression circuit including means for applying the phasing pulses as suppression pulses through a coupling capacitor to the grid of a normally conducting cathode follower tube having its cathode coupled to the output side of said modulator to apply bias thereto, a resistor connected to the grid of said cathode follower and having a value sufficiently high to provide a relatively long-time discharge path for said capacitor and operative to increase and maintain increased the conductivity of said cathode follower for increasing the bias on the output side of said modulator and suppress the output of the modulator for an interval corresponding to that required for scanning across said predetermined area of the transmitting blank.

12. A facsimile system comprising a transmitter and a recorder and a transmission circuit for interconnecting the transmitter and recorder, said transmitter and recorder respectively having elements for scanning transmitting and recording blanks and means including scan motors for actuating the scanning elements in successive linear scanning cycles to scan a blank, means for generating phasing pulses at the transmitter and recorder once during each revolution of the scan motors, said transmitter having an oscillator followed by a balanced modulator, means for applying phasing pulses generated at the transmitter to the input side of said modulator to cause it to supply phasing carrier pulses to the transmission circuit, means at the recorder responsive to said phasing pulses received over the circuit and to the phasing pulses generated at the recorder for establishing phase orientation of both scanning elements, means operative when phasing is accomplished for removing the phasing pulses from the input of the modulator and applying thereto the facsimile intelligence signals generated by said scanning element of the transmitter for modulating the carrier, said transmitter having means for preventing the transmission of facsimile signals during a predetermined linear portion of each scanning cycle of its scanning element comprising a suppression circuit effective when phasing is accomplished for applying the phasing pulses as suppression pulses through a coupling capacitor to the grid of a normally conducting cathode follower tube having its cathode coupled to the output side of said modulator to apply a biasing potential thereto, means including a variable contrast control element connected to the grid of said cathode follower for controlling the value of the bias applied to the output side of the modulator, a resistor connected to the grid of said cathode follower and having a value sufficiently high to maintain the conductivity of said cathode follower for maintaining the bias on the output side of said modulator and suppress the output of the modulator during intervals each corresponding to said predetermined linear portion of each scanning cycle.

13. A facsimile system comprising a first station and a second station, each of said stations having a facsimile transmitter and a facsimile recorder separate from each other and a transmission circuit for interconnecting said stations, and an interlocking circuit including means in control circuits at the transmitter and recorder at each station automatically operative to prevent the transmitter at either of the stations from starting when a call from the other station has been placed to the recorder at said either of the stations, and also if said recorder is operating, and to prevent the recorder at either of said stations from starting when the transmitter at that station is operating.

14. A system according to claim 13, including means responsive to said control circuits for automatically feeding transmitting copy and recording paper into the transmitter and recorder respectively at each of said stations, and said interlocking circuit includes means automatically operative to prevent transmitting copy from reaching the transmitting position in the transmitter at either of the stations when a call from the other station has been placed to the recorder at said either of the stations, and also if said recorder is operating, and to prevent recording paper from reaching the recording position in the recorder at either of said stations when the transmitter at that station is operating.

15. A system according to claim 13, in which said interlocking circuit includes means automatically operative to disconnect the recorder at either of said stations from the transmission circuit, and also to prevent the recorder from starting, when the transmitter at that station is operating.

16. A facsimile ticket reservation system in which information of different classifications may be transmitted from transmitting blanks of different kinds respectively representing a master ticket for recording ticket imprinting signals on the blank portion of a ticket form to produce a ticket, and a message copy sheet for recording on a message blank, comprising a facsimile transmitter having means including a rotatable cylindrical member and a flexible wrapper web coacting therewith for selectively mounting and properly positioning on said cylindrical member either a ticket or a message copy sheet for a scanning operation, a facsimile recorder, a transmission circuit for interconnecting said transmitter and recorder, means at the transmitter comprising a manually operable switch device for transmitting over said circuit a directive signal to the recorder and a signal device at the recorder responsive thereto for indicating that ticket imprinting signals are to be transmitted, said transmitter having means including another manually operable switch for transmitting over said circuit a different directive signal to the recorder and another signal device at the recorder responsive thereto for indicating that a message on a copy sheet is to be transmitted, said recorder having means for receiving and properly positioning for a scanning operation either a ticket form or a message blank as indicated by the energized one of said signal devices, means operative when either a ticket form or a message blank is positioned for a scanning operation for transmitting a signal to the transmitter, and means responsive to the last named signal for starting the transmitter to effect scanning of said ticket or the message on said copy sheet as the case may be.

References Cited in the file of this patent

UNITED STATES PATENTS

| | | |
|---|---|---|
| 2,262,715 | Wise | Nov. 11, 1941 |
| 2,356,116 | Ridings | Aug. 15, 1944 |
| 2,483,449 | Wise | Oct. 4, 1949 |
| 2,672,503 | Hallden | Mar. 16, 1954 |